CARTRIDGE TAPE RECORDER PLAY-BACK INSTRUMENT

Filed April 23, 1965 Sheet 1 of 3

INVENTORS
CHARLES L. TOWNSEND
BY JARED M. McGOWAN
Ward, Haselton, McElhannon, Orme, Brooks & Fitzpatrick
ATTORNEYS

CARTRIDGE TAPE RECORDER PLAY-BACK INSTRUMENT

INVENTORS
CHARLES L. TOWNSEND
BY JARED M McGOWAN

Ward, Haselton, McElhannon, Orme, Brooks & Fitzpatrick
ATTORNEYS

CARTRIDGE TAPE RECORDER PLAY-BACK INSTRUMENT

Filed April 23, 1965

INVENTORS
CHARLES L. TOWNSEND
JARED M. MCGOWAN
BY
Ward, Haselton, McElhannon, Brooks & Fitzpatrick
ATTORNEYS United States Patent Office 3,420,965

Patented Jan. 7, 1969

3,420,965

CARTRIDGE TAPE RECORDER PLAY-BACK INSTRUMENT

Charles L. Townsend, Cherry Hill, and Jared M. McGowan, Moorestown, N.J., assignors to Telepro Industries Incorporated, Cherry Hill, N.J., a corporation of New Jersey Filed Apr. 23, 1965, Ser. No. 450,284

U.S. Cl. 179—100.2 7 Claims

Int. Cl. G11b *5/00*

ABSTRACT OF THE DISCLOSURE

Cartridge type playback instrument having adjustable pick-up head for engaging a first pair of tracks when in one position and a second pair of tracks when in a second position and switching means for playing either track of said pair of tracks individually or in combination with the other track of said pair of tracks.

This invention relates to recorder plack-back instruments and more particularly to new and improved recorder plack-back instruments employing magnetic tape with prerecorded signals thereon.

While play-back instruments have been known and used for many years, they have been characterized by certain difficulties which include their lack of ability to withstand vibrations and other sudden movements that tend to disturb their reception and by the necessity of rewinding and inverting reels and manipulating a number of sensitive controls. Accordingly, there has been conceived by the present invention an effective solution to the problems presented and their has actually been constructed and successfully operated a commercially desirable play-back instrument based upon that concept. Thus, play-back instruments embodying the concepts of this invention are particularly adapted, among other possible uses, for installation in a motor vehicle.

Briefly, this invention contemplates the provision of a recorder plack-back instrument comprising a transducer head having first and second vertically spaced coils, means for progressively feeding a four track magnetic type past the head and means for controlling the relationship of the tape and head so that the signal on either track or on either of two pairs of tracks may be picked up by the head. Thus, the magnetic tape may be a known four-track stereophonic recording or it may be a four-track monophonic recording.

As an important aspect of the invention there is provided means for mounting the transducer head for vertical movement between a first position wherein the first of the coils is in engagement with the first track and the second of the coils is in engagement with the third track of the tape; and a second position wherein the first of the coils is in engagement with the second track and the second of the coils is in engagement with the fourth track of the tape.

Switching means are also provided having a first position for short-circuiting the second of the coils and allowing output from the first of the coils; and a second position for short-circuiting the first of the coils and allowing output from the second of the coils, whereby a separate recording can be carried on each of the four tracks of the tape and each can be played separately. That is, when the transducer head is in its first position, either track one or three may be played by short-circuiting the coil opposite the other track, and when the transducer head is in its second position, either track two or four may be played by short circuiting the coil opposite the other track. Further, the switching means incorporate a third position which interconnects the two coils in series and allows a combined output, whereby two of the tracks (one and three) or (two and four) may be interconnected for the play-back of a stereophonic recording.

As a further feature of the invention there is contributed an improvement in type player magnetic cartridges of the type disclosed and described in Patent No. 2,778,880. Accordingly, a single reel magnetic cartridge may be provided for use with a recording play-back machine comprising a housing, a reel mounted on the housing for rotation on an upright axis, and an endless spirally coiled roll of magnetic tape disposed on the reel. The reel is provided with a loop of tape projecting therefrom toward an open end of the housing and with one portion of the loop projecting from the convolution at the outer diameter of the roll and another portion of the loop projecting from the convolution at the inner diameter of the roll, an intermediate portion of the loop being exposed at the open end of the housing for cooperation with the drive means and a transducer head of the recording play-back machine which is to receive the cartridge. The magnetic tape is adapted for lengthwise advancing motion so that the loop is continuously brought into engagement with the transducer head. The tape has four parallel, vertically spaced monophonic tracks which may be disposed all on one side of the tape and each of the tracks has the same playing direction one with respect to the others so that the endless spirally coiled roll of magnetic tape may be played continuously without the necessity of reversing direction, rewinding, or inverting the cartridge.

This invention also embodies an improvement in means for advancing a magnetic tape past a transducer head of the general type disclosed and described in Patent No. 2,876,005. Thus, in accordance with this aspect of the invention, the recorder play-back instrument is provided with a pinch roll assembly which comprises mechanical linkage for rotating said pinch roll from a position removed from the cartridge up through an opening in the bottom of the cartridge to an operating position wherein it co-acts with a driving capstan to pinch the magnetic tape therebetween and thereby feed the tape through the machine. The pinch roll is adapted to be effectively retained in either of its preselected positions by a special toggle linkage.

A feature of the invention resides in the provision of a new and improved play-back instrument with which cartridge-type magnetic tape may be employed. This is a highly desirable feature due to the fact that there is presently available and commercially marketed a wide selection of recordings made on cartridge-type magnetic tape. Another feature of the invention resides in the provision of a play-back instrument into which cartridges may be quickly and simply inserted and removed.

Additionally, simple to operate means are provided for shifting the instrument from one track to another track as desired when playing a four track monophonic magnetic tape. Thus, by reason of this feature of the invention, it will be appreciated that a four track tape having on each track a separate monophonic recording, may be used to play back for a period of four times as long as it takes to run the tape through the instrument. When two tracks are picked up simultaneously as for stereophonic play-back the total play-back time is twice the time necessary to run the tape through the instrument.

A further feature of the invention is the provision of a new and improved retractable pinch roll mechanism by reason of which, the pinch roll is resiliently retained in either of its preselected positions, which provides a preselected driving force against the capstan notwithstanding wear of these elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 2, 4:
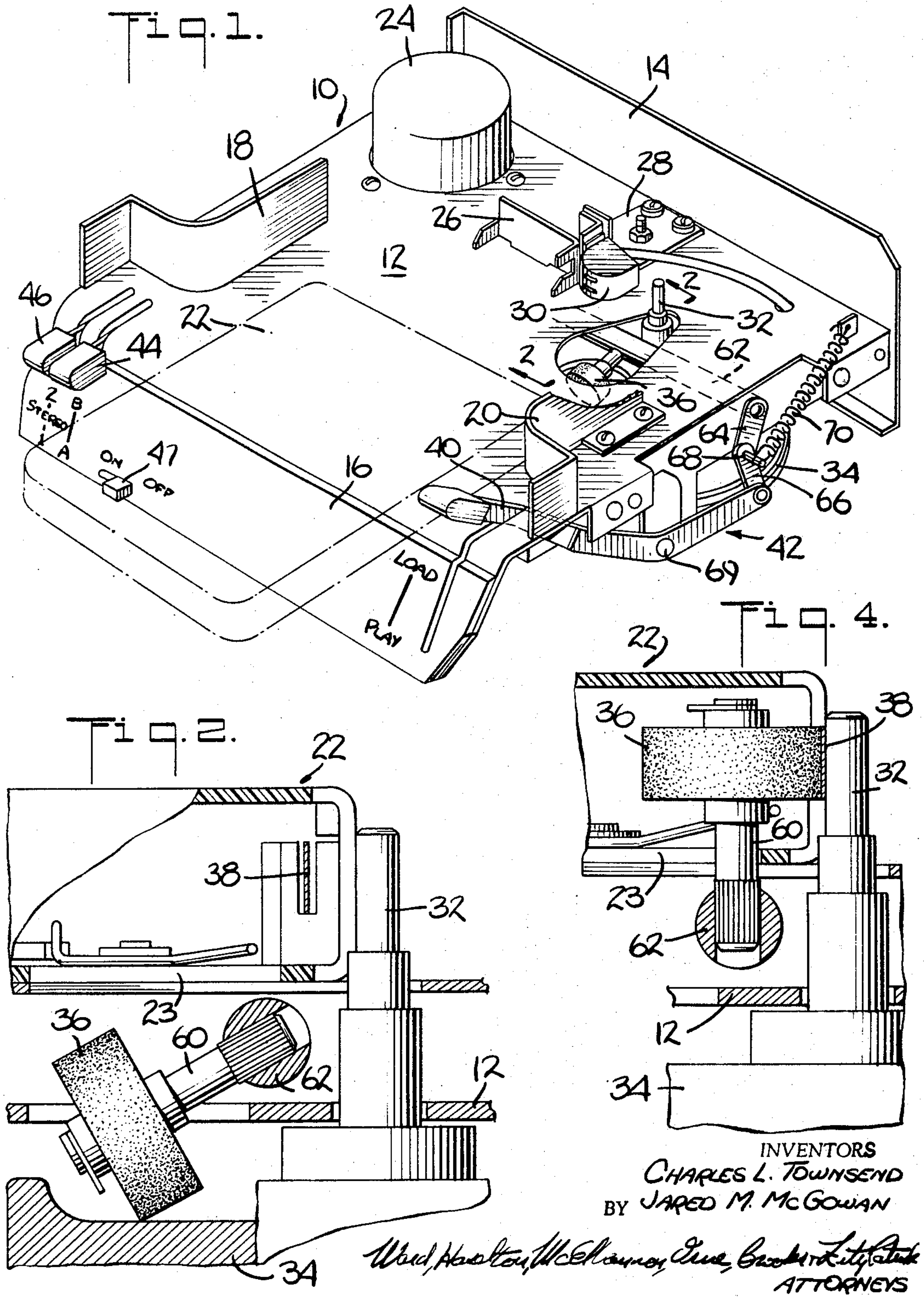
FIG. 1 is a perspective view showing a recorder play-back instrument constructed in accordance with the concepts of this invention.
FIG. 2 is an enlarged sectional view taken at lines 2—2 of FIG. 1.
FIG. 4 is an enlarged sectional view taken at lines 4—4 of FIG. 3 and showing means for progressively feeding the magnetic tape past the transducer head.
Figure 3:
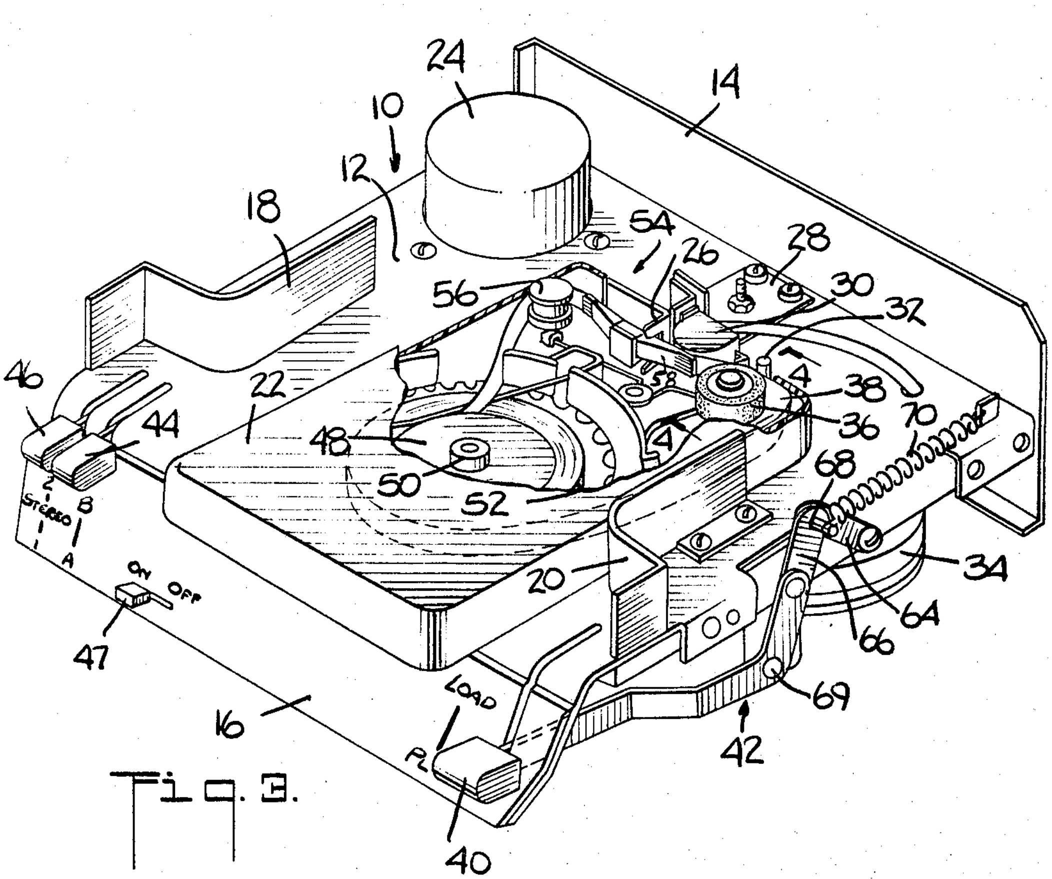
FIG. 3 is a perspective view with an endless magnetic tape cartridge positioned on the playing deck, the cartridge being partially broken away to reveal the interconnection between the transducer head and the magnetic tape as well as the driving means for feeding the magnetic tape past the head.

In the illustrated embodiment of the invention, as seen in FIGS. 1 and 3, the record play-back instrument includes a housing 10 having a deck 12, a back cover 14 and a front plate 16. Mounted on the deck 12 is a left cartridge guide 18 and a right cartridge guide 20 for aligning an endless magnetic tape cartridge shown in broken lines at 22 in FIG. 1 and in solid lines in FIG. 3. The play-back instrument further includes a motor 24, a tape guide 26 and a bracket 28 pivotally mounted on the deck 12 for carrying the transducer head 30. A capstan 32 projects upwardly through the deck 12 and is driven by the motor 24 through a fly wheel 34 by a drive belt not shown. A pinch roll 36 is adapted for pivotal movement from a position removed from the cartridge 22 as viewed in FIGS. 1 and 2 up through an opening 23 in the bottom of the cartridge 22 to an operating position as shown in FIGS. 3 and 4. In the latter position the pinch roll 36 co-acts with the driving capstan 32 to pinch the magnetic tape 38 therebetween and thereby feeds the tape through the machine. A manually operated lever 40 and a special toggle linkage indicated generally at 42, FIGS. 1 and 3, serve to position the pinch roll 36, as will be described more fully hereinafter. Still referring to FIGS. 1 and 3, it will be observed that manually operated levers 44 and 46 project through the cover 12 for purposes of positioning and controlling the transducer head 30 in a manner which will also be described more fully hereinafter. Additionally, the instrument is provided with a manual control knob 47 for off-on positioning.

As best seen in FIG. 3, the cartridge 22 is adapted to slide along the deck 12 between the guides 19 and 20 to its operative position. This cartridge comprises a rotatable reel 48 mounted on an upright axis 50. An endless spirally coiled roll 52 of magnetic tape 38 is coiled on the reel and has a loop of tape projecting therefrom toward an open end, designated generally at 54, of the cartridge 22 with one portion of the loop projecting from the convolution at the outer diameter of the roll, another portion of the loop projecting from the convolution at the inner diameter of the roll, and an intermediate portion of the loop exposed at the open end 54 of the cartridge for cooperation with the pinch roll 36 and the capstan 32 which imparts lengthwise advancing motion through the loop to effect stripping of the tape from the inner diameter of the roll and rotation of the reel in a direction to wind up the tape on the outer diameter of the roll. The tape passes around the guide post 56, the tape guide 26 and past the transducer head 30. A spring arm 58 is mounted on the cartridge as shown, to press the tape 58 against the transducer head 30.

As best seen in FIGS. 2 and 4, pinch roll 36 is mounted for rotary movement on arm 60, which is fixedly connected to rock shaft 62. A toggle joint is formed by arms 64 and 66 pivotally interconnected by pin 68, arm 64 being fixedly connected to rock shaft 62 and arm 66 being pivotally attached to the end of lever 40 which is itself pivotally mounted on the housing 10 as at 69. A spring member 70 extends between the pin 68 and a bracket mounted on the housing 12. This spring resiliently retains the pinch roll 36 in either of its positions. That is, when toggle arm 64 is below its horizontal position as viewed in FIG. 1, the lever 40 is in its upper or load position, and the pinch roll 36 is in its remote position, spring 70 tends resiliently to retain the linkage in this position. When the lever 40 is moved downwardly or towards its play position, arm 64 moves upwardly until it reaches a position slightly above its horizontal position at which time the spring 70 again tends to pull the pin 68 to the right as viewed in FIGS. 1 and 3 thereby moving the toggle linkage to a position as shown in FIG. 3. In this position the lever 40 is down in its play position, and the pinch roll 36 is in its operative position engaging capstan 32. It will be appreciated that when the linkage is in the position as shown in FIG. 3, the spring 70 tends to maintain the linkage in this position and furthermore the spring 70 in effect urges the pinch roll 36 against the capstan 32 with the force of the spring. Accordingly, the pinch roll will always engage the capstan with a constant predetermined force, namely that of the spring force. This is particularly desirable because the pressure will not vary due to roller wear. Further, this linkage will not be moved out of adjustment due to vibration while the instrument is being operated.

Figures 6, 7, 8, 9, 10:
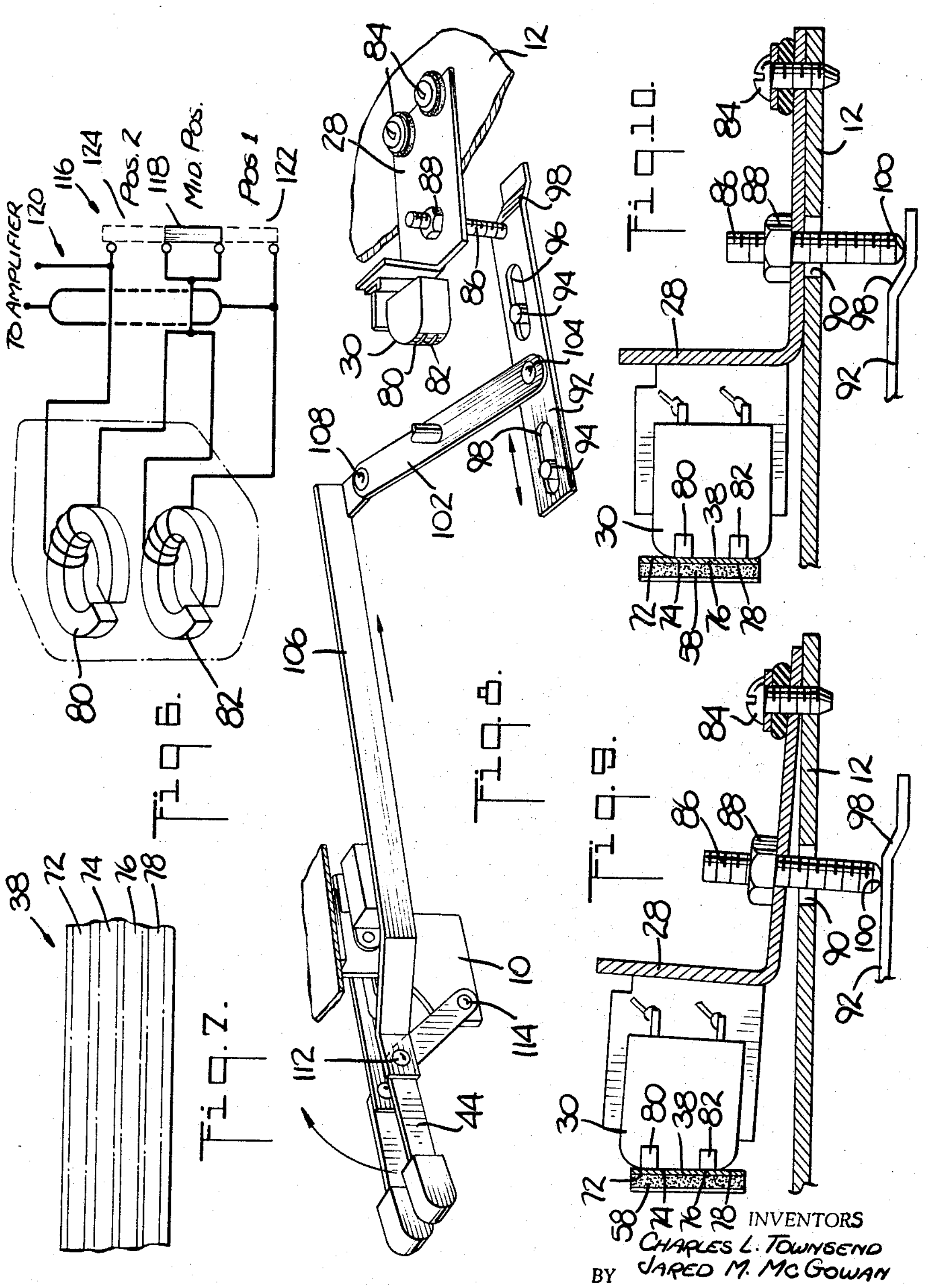
FIG. 6 is an enlarged schematic diagram showing the electrical circuitry for controlling the transducer head.
FIG. 7 is an enlarged plan view of a portion of the endless magnetic tape upon which prerecorded signals are placed.
FIG 8 is an enlarged, perspective, fragmentary view of the mechanical linkage means for mounting the transducer head for movement with respect to the housing.
FIG. 9 is an enlarged sectional view showing the mounting means for the transducer head with respect to the record play-back instrument deck when the head is in its upper position.
FIG. 10 is a vertical sectional view similar to FIG. 9 but showing the transducer head in its lower position.

Referring to FIG. 7, there is shown a portion of the endless magnetic tape 38 which has four horizontally extending parallel magnetic tracks 72, 74, 76 and 78 each of which incorporates prerecorded signals. That is, the magnetic tape 38 may be a known, four-track stereophonic recording or it may be a four-track monophonic recording. If it is a stereophonic recording, then the first (72) and third (76) tracks are played simultaneously, and alternately the second (74) and fourth (78) tracks are played simultaneously. If the tape is monophonic then each of the four tracks are played individually. As pointed out hereinbefore, according to the present invention, either a stereophonic recording or a monophonic recording may be played back on this instrument.

Means are provided for mounting the transducer head 30 for vertical movement. As best seen in FIGS. 8, 9 and 10, the transducer head 30 is provided with a first coil 80 and a second coil 82 which are connected to an amplifier of known construction. The transducer head 30 is adapted for vertical movement between a first position as shown in FIG. 9 wherein the first of the coils 80 is in engagement with the first track 72 of the magnetic tape and the second of the coils 82 is in engagement with the third track 76 of the magnetic tape, and a second position wherein the first of the coils 80 is in engagement with the second track 74 and the second of the coils 82 is in engagement with the fourth track 78 of the tape.

Still referring to FIGS. 8, 9 and 10 the transducer head 30 is fixedly mounted on a bracket 28 which, in turn, is pivotally mounted on the deck 12 as by fastening means 84. Attached to the bracket 28 is a head lift pin 86 which is adjustable by means of nut 88. This pin passes through an opening 80 in the deck 12 (FIGS. 9 and 10) to slidably engage a head actuator slide 92. Referring to FIG. 8, the head actuator slide 92 is adapted for horizontal sliding motion on pins 94 which extend into slots 96. The head actuator slide 92 is provided with a ramp portion 98 which engages the end of the head lift pin 86 as at 100. Accordingly, it will be appreciated that when the slide 92 moves horizontally as indicated by the arrow in FIG. 8, the head lift pin is raised or lowered as it moves up or down the ramp portion 98, thereby causing the transducer head 30 to move between its lower position as viewed in FIG. 10 and its raised position as viewed in FIG. 9.

As best seen in FIG. 8, the head actuator slide 92 is actuated by means of a pivot arm 102 which is pivotally connected thereto as at 104, the other end of arm 102 being pivotally connected to a link arm 106 as at 108. The link arm 106 is in turn pivotally connected to the head control lever 44 as at 112, and the latter lever is pivotally mounted on the housing 10 as at 114.

Figure 5:
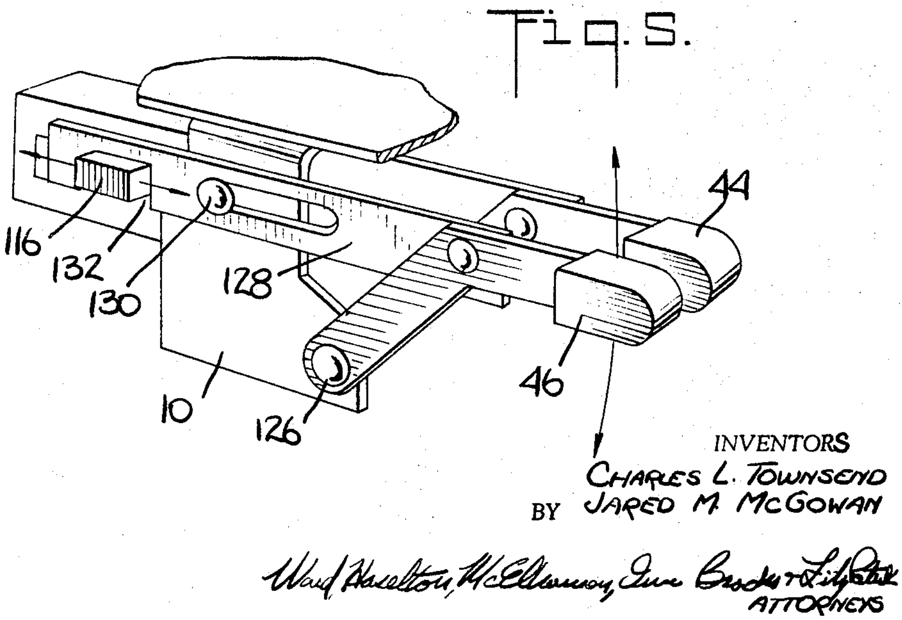
FIG. 5 is an enlarged perspective view showing a portion of the means for positioning and controlling the transducer head.

As has been pointed out hereinbefore, the play-back instrument according to this invention is adapted to play-back either stereophonic or monophonic recordings. Therefore, switching means, designated generally at 116 in FIGS. 5 and 6, are provided for short-circuiting one or the other of the coils (80, 82) when playing one of the monophonic tracks. Also, the same switch can connect the coils in series when stereophonic tracks are being played. As best seen in FIG. 6, switch 116 is a four pole, three position switch having a mid-position 118 known as the stereophonic position, wherein the coils 80 and 82 are connected in series and supply a combined output to the amplifier leads 120. When the switch is in its first position 122, then the second coil 82 is shorted out so that only the output from coil 80 passes to the amplifier leads 120. When the switch 116 is in its second position 124, then coil 80 is shortened out, thereby allowing only the output from coil 82 to pass to the amplifier leads 118. The switch 116 is operated by means of lever 46 (FIG. 5) which is pivotally mounted on housing 10 at 126 to actuate sliding link 128 which slides on pin 130 provided for the purpose. Link 128 is provided with a cut-out portion 132 for receiving the switch 116. Hence, manual movement of lever 46, as shown by the arrows in FIG. 5, serves to position switch 116, as desired.

In summary, it will be appreciated that the play-back instrument can play stereophonic recordings by placing the lever 46 in its mid-position so that the first and third tracks 72 and 76, respectively, are played simultaneously when the transducer head is in its upper position, and the second and fourth tracks 74 and 78, respectively, are played when the transducer head is in its lower position. Also, with the play-back instrument, any one of the four monophonic tracks on the tape may be selected by manipulating levers 44 and 46, FIGS. 1 and 3. That is, track one, 72 (FIG. 7) is selected by positioning the head 30 in its upper position (FIG. 9) and shifting switch 116 (FIG. 6) to its first position 122. Track two, 74 (FIG. 7) is selected by positioning the head 30 in its lower position (FIG. 10) and retaining switch 116 (FIG. 6) in its first position 122. Track three, 76 (FIG. 7) is selected by positioning the head 30 in its upper position (FIG. 9) and positioning switch 116 (FIG. 6) in its second position

124. Track four, 78 (FIG. 7) is selected by positioning the head 30 in its lower position (FIG. 10) and retaining switch 116 (FIG. 6) in its second position 124.

From the foregoing it will be seen that I have conceived a novel and highly desirable recorder play-back instrument.

Although a particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A record play-back instrument comprising a housing, a transducer head having first and second vertically spaced coils, means for progressively feeding an endless magnetic tape disposed in a cartridge past said head, said tape having at least four vertically spaced tracks, means mounting said head on said housing for vertical movement between a first position wherein the first of said coils is engageable with the first track and the second of said coils is engageable with the third track, and a second position wherein the first of said coils is engageable with the second track and the second of said coils is engageable with the fourth track, switching means having a first position for short-circuiting the second of said coils, a second position for short-circuiting the first of said coils, and a third position connecting said coils in series allowing a combined output from said coils.

2. A record play-back instrument comprising a housing, a transducer head having first and second vertically spaced coils, an endless spirally coiled roll of magnetic tape mounted in a cartridge having an open end of which a loop of said tape projects for engaging said transducer head, means for progressively feeding said tape past said head, said tape having at least four vertically spaced tracks, means mounting said head on said housing for vertical movement between a first position wherein the first of said coils is engageable with the first track and the second of said coils is engageable with the third track, and a second position wherein the first of said coils is engageable with the second track and the second of said coils is engageable with the fourth track, switching means having a first position for short circuiting the second of said coils and allowing output from the first of said coils, a second position for short circuiting the first of said coils and allowing output from the second of said coils, and a third position connecting said coils in series allowing a combined output from said coils.

3. A record play-back instrument comprising a housing having a deck, a transducer head having first and second vertically spaced coils, an endless spirally coiled roll of magnetic tape mounted in a cartridge having an open end out of which a loop of said tape projects for engagement with said transducer head, a pinch roll assembly comprising a toggle linkage for rotating a pinch roll from a position removed from the cartridge up through an opening in the bottom of the cartridge to an operating position wherein it co-acts with a driven capstan to pinch said magnetic tape therebetween and thereby progressively feed the tape past said head, said tape having at least four vertically spaced tracks all being disposed on one side thereof, each of said tracks having the same playing direction one with respect to the other, means mounting said head on said deck for vertical movement between a first position wherein the first of said coils is in engagement with the first track and the second of said coils is in engagement with the third track, and a second position wherein the first of said coils is in engagement with the second track and the second of said coils is in engagement with the fourth track, said means mounting said head comprising a bracket pivotally mounted on said deck, said head being fixedly attached to said bracket, a pin-like member projecting inwardly from said bracket, a head actuator slide member adapted for linear movement with respect to said deck, said slide having a ramp-like portion for slidably engaging the end of said pin-like member to cause motion of said pin member perpendicularly with respect to said deck, a head control lever, link arm and pivot arm all sequentially pivotally interconnected to actuate said head actuator slide whereby manual movement of said head control lever actuates said transducer head, track selection switching means having a first position for short-circuiting the second of said coils and allowing output from the first of said coils, a second position for short-circuiting the first of said coils and allowing output from the second of said coils, and a third position connecting said coils in series allowing a combined output.

4. An instrument for playing-back prerecorded magnetic tape contained in a cartridge comprising a housing, a transducer head having first and second vertically spaced coils, a pinch roll assembly comprising an over-center spring action linkage for rotating a pinch roll from a position removed from the cartridge up through an opening in the bottom of the cartridge to an operating position wherein said over-center spring action holds the pinch roll in engagement with a driving capstan with a preselected force to pinch said magnetic tape therebetween and thereby progressively feed the tape past said head, said tape having at least four vertically spaced tracks, means mounting said head on said housing for vertical movement between a first position wherein the first of said coils is in engagement with the first track and the second of said coils is in engagement with the third track, and a second position wherein the first of said coils is in engagement with the second track and the second of said coils is in engagement with the fourth track, said means mounting said head comprising a bracket pivotally mounted on said frame, said head being fixedly attached to said bracket, linkage means for selectively pivoting said bracket, switching means having a first position for short circuiting the second of said coils and allowing output from the first of said coils, a second position for short circuiting the first of said coils and allowing output from the second of said coils, and a third position connecting said coils in series allowing a combined output.

5. A record play-back instrument adapted to employ magnetic tape comprising a housing having a top panel, a driving capstan mounted on said top panel for rotary motion, a transducer head disposed adjacent said capstan, a pinch roll assembly comprising a toggle linkage for rotating a pinch roll from a position removed from said capstan up through an opening in the top panel to an operating position in engagement with said capstan to pinch said magnetic tape therebetween and thereby progressively feed the tape past said transducer head, said toggle linkage comprising an arm upon which said pinch roll is mounted for rotation, a rock shaft fixedly connected to said arm, a toggle joint having one arm pivotally connected to said rock shaft and having the other arm pivotally connected to a manually operable lever, said arms being interconnected by pin means, a spring interconnecting said pin means with said housing whereby said spring force tends to resiliently retain said pinch roll in either of its two positions.

6. In a recorder play-back instrument of the class described a pinch roll assembly comprising a toggle linkage for rotating a pinch roll from a position removed from a driving capstan to an operating position in engagement with said capstan to pinch a magnetic tape therebetween for feeding the tape through said play-back instrument, said toggle linkage comprising an arm upon which said pinch roll is mounted for rotation, a rock shaft fixedly connected to said arm, a toggle joint having one arm pivotally connected to said rock shaft and having the other arm pivotally connected to a manually operable lever, said arms being interconnected by pin means, a spring interconnecting said pin means with said housing whereby said spring force tends to resiliently retain said pinch roll in either of its two positions.

7. A record play-back instrument comprising a housing, a transducer head having first and second vertically spaced coils, means for progressively feeding a magnetic tape past said head, said tape having at least four vertically spaced tracks, means mounting said head on said housing for vertical movement between a first position wherein the first of said coils is engageable with the first track, the second of said coils is engageable with the third track, and a second position wherein the first of said coils is engageable with the second track and the second of said coils is engageable with the fourth track, said means mounting said head comprising a bracket pivotally mounted on said housing, said head being fixedly attached to said bracket, a pin-like member fixedly projecting inwardly from said bracket, a head actuator slide member adapted for linear movement with respect to said housing, said slide member having a ramp-like portion for slidably engaging the end of said pin member to cause motion of said pin member with respect to said housing, a head control lever, link arm, and pivot arm all sequentially pivotally connected to actuate said head actuator slide member whereby manual movement of said head control lever actuates said transducer head, switching means having a first position for short-circuiting the second of said coils and allowing output from the first of said coils, a second position for short-circuiting the first of said coils and allowing output from the second of said coils, and a third position connecting said coils in series allowing a combined output.

References Cited

UNITED STATES PATENTS

| | | | |
|---|---|---|---|
| 2,876,005 | 3/1959 | Eash | 179—100.2 |
| 2,914,620 | 11/1959 | Dale | 179—100.2 |
| 3,102,170 | 8/1963 | DeKoning | 179—100.2 |
| Re. 25,719 | 1/1965 | Johnson et al. | 179—100.2 |
| 3,271,034 | 9/1966 | Andrews | 179—100.2 |

BERNARD KONICK, *Primary Examiner.*

J. R. GOUDEAU, *Assistant Examiner.*

U.S. Cl. X.R.

226—90